(12) United States Patent
Tabuchi et al.

(10) Patent No.: US 10,577,187 B2
(45) Date of Patent: Mar. 3, 2020

(54) WORK PIECE CONVEYANCE JIG AND CONVEYANCE DEVICE PROVIDED WITH SAME, AND INDUCTION HEATING DEVICE

(71) Applicant: NTN CORPORATION, Osaka (JP)

(72) Inventors: Yuuki Tabuchi, Shizuoka (JP); Shintaro Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/334,040

(22) PCT Filed: Sep. 7, 2017

(86) PCT No.: PCT/JP2017/032298
§ 371 (c)(1),
(2) Date: Mar. 18, 2019

(87) PCT Pub. No.: WO2018/056066
PCT Pub. Date: Mar. 29, 2018

(65) Prior Publication Data
US 2019/0270595 A1 Sep. 5, 2019

(30) Foreign Application Priority Data

Sep. 21, 2016 (JP) .................................. 2016-184293

(51) Int. Cl.
*B65G 33/04* (2006.01)
*B65G 33/00* (2006.01)
(Continued)

(52) U.S. Cl.
CPC ............... *B65G 33/04* (2013.01); *C21D 1/00* (2013.01); *C21D 1/10* (2013.01); *C21D 9/36* (2013.01);
(Continued)

(58) Field of Classification Search
None
See application file for complete search history.

(56) References Cited

U.S. PATENT DOCUMENTS 4,361,163 A * 11/1982 Aigo ...................... B08B 3/02
134/164
4,363,163 A * 12/1982 McMaster ............. C03B 35/181
226/190

(Continued)

FOREIGN PATENT DOCUMENTS

DE 198 27 608 2/2000
JP 54-37452 3/1979
(Continued)

OTHER PUBLICATIONS

International Search Report dated Dec. 12, 2017 in International (PCT) Application No. PCT/JP2017/032298.
(Continued)

*Primary Examiner* — Kavel Singh
(74) *Attorney, Agent, or Firm* — Wenderoth, Lind & Ponack, L.L.P.

(57) ABSTRACT

A workpiece conveyance jig, which is formed of a threaded shaft made of a ceramic, includes an inner member, which is formed of a solid shaft having a constant diameter, and is configured to receive a rotational driving force, and an outer member, which has a hollow shaft-like shape, has a helical protrusion, and is mounted on an outer periphery of the inner member so as to be rotatable integrally with the inner member. The outer member includes a plurality of cylindrical bodies arranged in a row in an axial direction of the workpiece conveyance jig, and has a convex and concave fitting portion formed between two adjacent ones of the plurality of cylindrical bodies, which is configured to engage the two adjacent cylindrical bodies with each other in a direction of rotation of the inner member.

10 Claims, 7 Drawing Sheets

(51) Int. Cl.
  *C21D 1/10* (2006.01)
  *C21D 9/36* (2006.01)
  *H05B 6/10* (2006.01)
  *C21D 1/00* (2006.01)
  *F16C 33/34* (2006.01)

(52) U.S. Cl.
  CPC ....... *H05B 6/10* (2013.01); *B65G 2201/0232* (2013.01); *F16C 33/34* (2013.01); *Y02P 10/253* (2015.11)

(56) References Cited

U.S. PATENT DOCUMENTS 5,413,638 A * 5/1995 Bernstein, Jr. ............ C23C 4/16
　　　　　　　　　　　　　　　　　　　　　　118/308
6,619,471 B1 * 9/2003 Downie ................ F27B 9/2407
　　　　　　　　　　　　　　　　　　　　　　198/780

FOREIGN PATENT DOCUMENTS

| JP | 2001-261143 | 9/2001 |
| JP | 2002-367762 | 12/2002 |
| JP | 2005-331005 | 12/2005 |
| JP | 2009-084664 | 4/2009 |

OTHER PUBLICATIONS

International Preliminary Report on Patentability and Written Opinion of the International Searching Authority dated Mar. 26, 2019 in International (PCT) Application No. PCT/JP2017/032298.

* cited by examiner

WORK PIECE CONVEYANCE JIG AND CONVEYANCE DEVICE PROVIDED WITH SAME, AND INDUCTION HEATING DEVICE

TECHNICAL FIELD

The present invention relates to a workpiece conveyance jig and a conveyance device comprising the same, and more particularly, to a workpiece conveyance jig and a conveyance device, which can suitably be used in an induction heating apparatus configured to inductively heat a workpiece to a target temperature.

BACKGROUND ART

For example, in a manufacturing process of a workpiece, more specifically, a rod-shaped workpiece having an outer peripheral surface with a circular cross section (the same applies hereinafter unless otherwise specified), for which a high mechanical strength and a high hardness are required as in a case of a rolling element such as a roller that is included in a rolling bearing, a heat treatment (quench hardening) for applying, for example, the mechanical strength required for the workpiece is carried out. The heat treatment includes, for example, a heating step of heating the workpiece being a target of the heat treatment to a target temperature and a cooling step of cooling the heated workpiece. The heating step can be carried out, for example, with use of an atmosphere heating furnace such as a mesh belt-type continuous furnace or an induction heating apparatus (for example, Patent Literature 1). In particular, with the induction heating, the following advantages are provided. Specifically, only the workpiece can be directly heated, and hence high energy efficiency can be achieved. Besides, a compact heat treatment apparatus can be achieved.

The induction heating apparatus disclosed in Patent Literature 1 includes a guide pipe as a guide member, which is configured to guide and move the workpiece along an axial direction of the workpiece, a heating coil, which is arranged on an outer periphery of the guide pipe and is configured to inductively heat the workpiece moved inside the guide pipe, and a pushing part, which is provided on an inlet side of the guide pipe and is configured to sequentially push the workpieces into the guide pipe. In this case, each of the workpieces is moved in the axial direction along with the pushing of a subsequent workpiece into the guide pipe.

CITATION LIST

Patent Literature 1: JP 2005-331005 A
Patent Literature 2: JP 2009-84664 A

SUMMARY OF INVENTION

Technical Problem

In the induction heating apparatus disclosed in Patent Literature 1, the workpiece is inductively heated while being moved in a given posture inside the guide pipe. Therefore, a difference is liable to be generated in heating temperature between a region of the workpiece, which is in contact with the guide pipe, and a remaining region. Thus, temperature unevenness is liable to occur in the workpiece after the completion of heating. As a result, there is a possibility that a desired mechanical strength cannot be provided to the workpiece. It is conceivable that the above-mentioned problem can be eliminated as much as possible by vibrating a guide member as disclosed in, for example, Patent Literature 2. Even when the guide member is vibrated, however, the workpiece cannot necessarily be inductively heated while the posture of the workpiece is being appropriately changed.

In the induction heating apparatus disclosed in Patent Literature 1, each of the workpieces is conveyed and inductively heated under a state of being held in contact with the workpiece that is adjacent thereto in the axial direction. Hence, each of the workpieces is susceptible to a change in magnetic flux of the workpiece that is adjacent thereto. Therefore, there is a problem in that the heating temperature of the workpiece is not stable.

Thus, as a result of a great deal of intensive research, the inventors of the present invention have devised a conveyance device, which is configured to convey a workpiece being a target to be inductively heated along an axial direction of the workpiece, and is capable of solving the various problems described above as much as possible. More specifically, the conveyance device includes a first shaft member and a second shaft member, which extend in parallel to each other in the axial direction so as to be separated from each other, and are arranged inside a heating coil, and a rotary mechanism configured to rotate the first shaft member about an axis thereof and the second shaft member about an axis thereof in the same direction. At least one of the first shaft member and the second shaft member is formed of a threaded shaft having a helical protrusion formed along an outer periphery thereof. At the same time, an outer peripheral surface of the workpiece can be supported between a groove bottom surface of a helical groove that is defined by the helical protrusion on the one shaft member and an outer peripheral surface of another one of the shaft members, which is opposed to the groove bottom surface, in a contact manner. The above-mentioned conveyance device is described later in detail for, for example, an overall structure thereof.

Although the above-mentioned conveyance device that is devised by the inventors of the present invention can solve the above-mentioned problems, which may occur in the inductive heating apparatus disclosed in Patent Literature 1, there is a problem in that a large cost is required to manufacture the threaded shaft having the helical protrusion formed on the outer periphery, which is one of the first shaft member and the second shaft member. Specifically, because of the arrangement of the first shaft member and the second shaft member inside the heating coil, it is preferred that the first shaft member and the second shaft member, which are included in the above-mentioned conveyance device, be manufactured of a non-magnetic material, in particular, a ceramic excellent in, for example, heat resistance and abrasion resistance among the non-magnetic materials. However, the ceramic is generally a difficult-to-process material. Therefore, it is extremely difficult to accurately manufacture the threaded shaft that is formed integrally throughout the entire region. In particular, when a heating coil having a dimension that is considerably larger than a dimension of the workpiece, for example, when a heating coil having a total length dimension of about several hundreds of mm is used for a workpiece having a total length dimension falling within a range of from about ten mm to several tens of mm so as to efficiently and accurately heat the workpiece in an induction heating apparatus using the above-mentioned conveyance device, a threaded shaft having a considerably large dimension is also required. In order to form the above-mentioned threaded shaft described above integrally of a ceramic material, the threaded shaft is inevitably required to be manufactured by machining. Thus, an enormous processing cost is required.

In view of the actual circumstances described above, the present invention has an object to enable easy (low-cost) and accurate manufacture of a threaded shaft made of a ceramic, which is to be used as a workpiece conveyance jig, and therefore to contribute to reduction in cost of a conveyance device which can suitably be used for an induction heating apparatus.

Solution to Problem

According to one embodiment of the present invention, which is devised to achieve the above-mentioned object, there is provided a workpiece conveyance jig, which is formed of a shaft-shaped body made of a ceramic, the shaft-shaped body having a helical protrusion formed along an outer periphery of the shaft-shaped body, and is to be rotationally driven along an axis of the workpiece conveyance jig under a state of being arranged inside an induction heating coil, the workpiece conveyance jig comprising: an inner member, which is formed of a solid shaft having a constant diameter, and is configured to receive a rotational driving force; and an outer member, which has a hollow shaft-like shape, has the helical protrusion, and is mounted on an outer periphery of the inner member so as to be rotatable together with the inner member, wherein the outer member comprises a plurality of cylindrical bodies arranged in a row in an axial direction of the workpiece conveyance jig, and has a convex and concave fitting portion formed between two adjacent ones of the plurality of cylindrical bodies, which is configured to engage the two adjacent cylindrical bodies with each other in a direction of rotation of the inner member.

As described above, the workpiece conveyance jig according to one embodiment of the present invention, which is formed of the shaft-shaped body (threaded shaft) having the helical protrusion formed along the outer periphery, is formed of an assembly of the plurality of segmentalized members. In this case, in comparison to a case in which the entire threaded shaft is formed integrally of a ceramic material, each individual member can easily and accurately be manufactured. More specifically, the inner member that is formed as the solid shaft having the constant diameter can easily and accurately be manufactured even of the ceramic material. Further, because the outer member having the helical protrusion is formed of the cylindrical bodies arranged in a row in the axial direction, each of the cylindrical bodies is only required to have a small dimension in the axial direction. In this case, besides machining such as cutting, ceramic injection molding (CIM) may be selected as a method of manufacturing the cylindrical bodies. With the CIM, even the cylindrical bodies, each having a complex shape that contains part of the helical protrusion, can easily and accurately be manufactured in comparison to manufacture of the cylindrical bodies with the machining such as cutting. In particular, the inner member, which is a target over which the cylindrical bodies are to be mounted, is formed to have a constant diameter. Therefore, the same parts can be used for all the cylindrical bodies. In this case, a cost reduction effect provided by the manufacture of the cylindrical bodies with the CIM may be effectively enjoyed.

In terms of the structure of the present invention, after the inner member and the plurality of cylindrical bodies are individually manufactured, the inner member and the plurality of cylindrical bodies are required to be assembled to each other. Therefore, there is a fear of increasing an overall manufacturing cost, which may be brought about by additionally providing an assembly step. In this regard, the outer member can be formed only by mounting the cylindrical bodies over the outer periphery of the inner member so that the cylindrical bodies are fitted to each other by convex and concave fit. Hence, even when the assembly step is additionally provided, the manufacturing cost is little increased. Therefore, according to one embodiment of the present invention, the workpiece conveyance jig formed of the threaded shaft made of the ceramic can easily and accurately be manufactured at low cost.

The workpiece conveyance jig according to one embodiment of the present invention is to be rotationally driven about the axis thereof, and therefore is required to be able to transmit a torque, specifically, a rotational torque between the members. In this regard, the outer member is mounted over the outer periphery of the inner member so as to be rotatable together with the inner member, specifically, rotatable integrally with the inner member that receives the rotational driving force. Further, the convex and concave fitting portion is formed between two adjacent ones of the cylindrical bodies in the outer member comprising the plurality of cylindrical bodies. Thus, the transmission of the torque is suitably ensured.

A convex portion having a semi-cylindrical shape, which is configured to form the convex and concave fitting portion, may be formed at each of an end of each of the cylindrical bodies on one axial side and an end thereof on another axial side, and the convex portion on the one axial side may be formed at a position that is shifted by 180 degrees in phase in a circumferential direction of the cylindrical body from a position of the convex portion on the another axial side. In this case, a circumferential region of each of the end of the cylindrical body on the one axial side and the end thereof on the another axial side, except for the convex portion, forms a concave portion into which the convex portion of the cylindrical body adjacent thereto is to be fitted.

Further, the each of the cylindrical bodies may comprise one turn of the helical protrusion in an integral manner. In this manner, a request for, for example, change in pitch of part of the helical protrusion, specifically, the multi-winding helical protrusion, can easily be complied with.

When the inner member is formed of a columnar shaft, more specifically, a solid shaft having a constant diameter, which has an outer peripheral surface with a circular cross section, the inner member with predetermined accuracy can easily be manufactured at low cost.

In view of ease of assembly of the cylindrical bodies over the inner member, it is preferred that an inner peripheral surface of each of the cylindrical bodies be fitted over the outer peripheral surface of the inner member by clearance fit (see JIS B 0401-1). In this case, the rotational torque of the inner member that receives the rotational driving force can be transmitted to the outer member, for example, through intermediation of a restricting part configured to restrict separation of two adjacent ones of the cylindrical bodies, specifically, release of a convex and concave fitting state.

In, for example, a conveyance device configured to convey a rod-shaped workpiece, which has an outer peripheral surface with a circular cross section, and is a target to be inductively heated, along an axial direction of the rod-shaped workpiece, the conveyance device comprising: a first shaft member and a second shaft member, which extend in parallel to each other in the axial direction so as to be separated from each other, and are configured to support an outer peripheral surface of the rod-shaped workpiece in a contact manner in cooperation with each other; and a rotary mechanism configured to rotate the first shaft member about an axis of the first shaft member and the second shaft member about an axis of the second shaft member in the same direction, the workpiece conveyance jig according to one embodiment of the present invention described above may be used as at least one of the first shaft member and the second shaft member.

In the conveyance device having the above-mentioned configuration, any one of the first shaft member and the second shaft member may be formed of the workpiece conveyance jig according to one embodiment of the present invention, whereas another one of the first shaft member and the second shaft member may be formed of a columnar shaft having a constant diameter.

The rotary mechanism can be configured to rotate the first shaft member and the second shaft member at different velocities. Besides, the rotary mechanism may also be configured to rotate the first shaft member and the second shaft member at the same velocity.

As the rod-shaped workpiece, a roller for a roller bearing may be exemplified. The term "roller bearing" herein encompasses the concepts of a cylindrical roller bearing, a tapered roller bearing, and a needle roller bearing. Therefore, the term "roller" encompasses the concepts of a cylindrical roller, a tapered roller, and a needle roller.

With an induction heating apparatus comprising the conveyance device having the configuration described above and an induction heating coil to be arranged around the first shaft member and the second shaft member, which are included in the conveyance device, the rod-shaped workpiece can be suitably inductively heated to a target temperature.

Advantageous Effects of Invention

As described above, according to one embodiment of the present invention, the workpiece conveyance jig formed of the threaded shaft made of the ceramic can easily and accurately be manufactured at low cost. With this, it is possible to contribute to reduction in cost of the conveyance device which can suitably be used for the induction heating apparatus.

DESCRIPTION OF EMBODIMENT

Now, an embodiment of the present invention is described with reference to the drawings. For convenience of description, an overall structure of a heat treatment apparatus in which a conveyance device comprising a workpiece conveyance jig according to the embodiment of the present invention is to be used is first described. Subsequently, a detailed structure of the workpiece conveyance jig is described.

Figure 1:
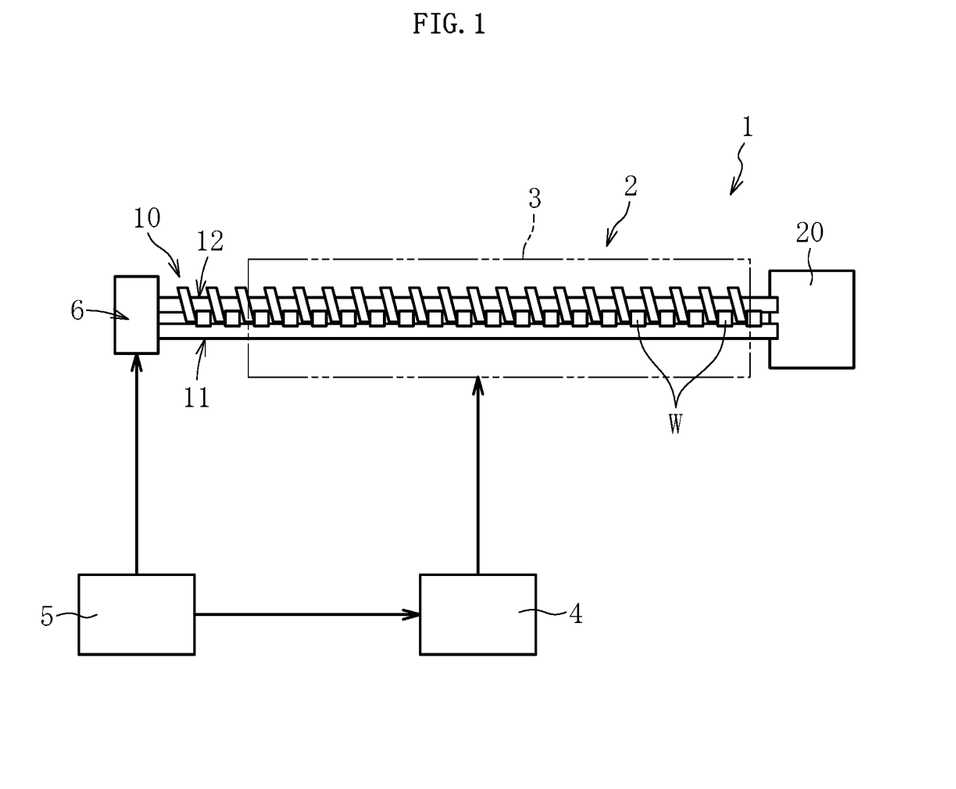
FIG. 1 is a view for schematically illustrating an overall structure of a heat treatment apparatus in which a workpiece conveyance jig according to an embodiment of the present invention is to be used.
Figure 4:
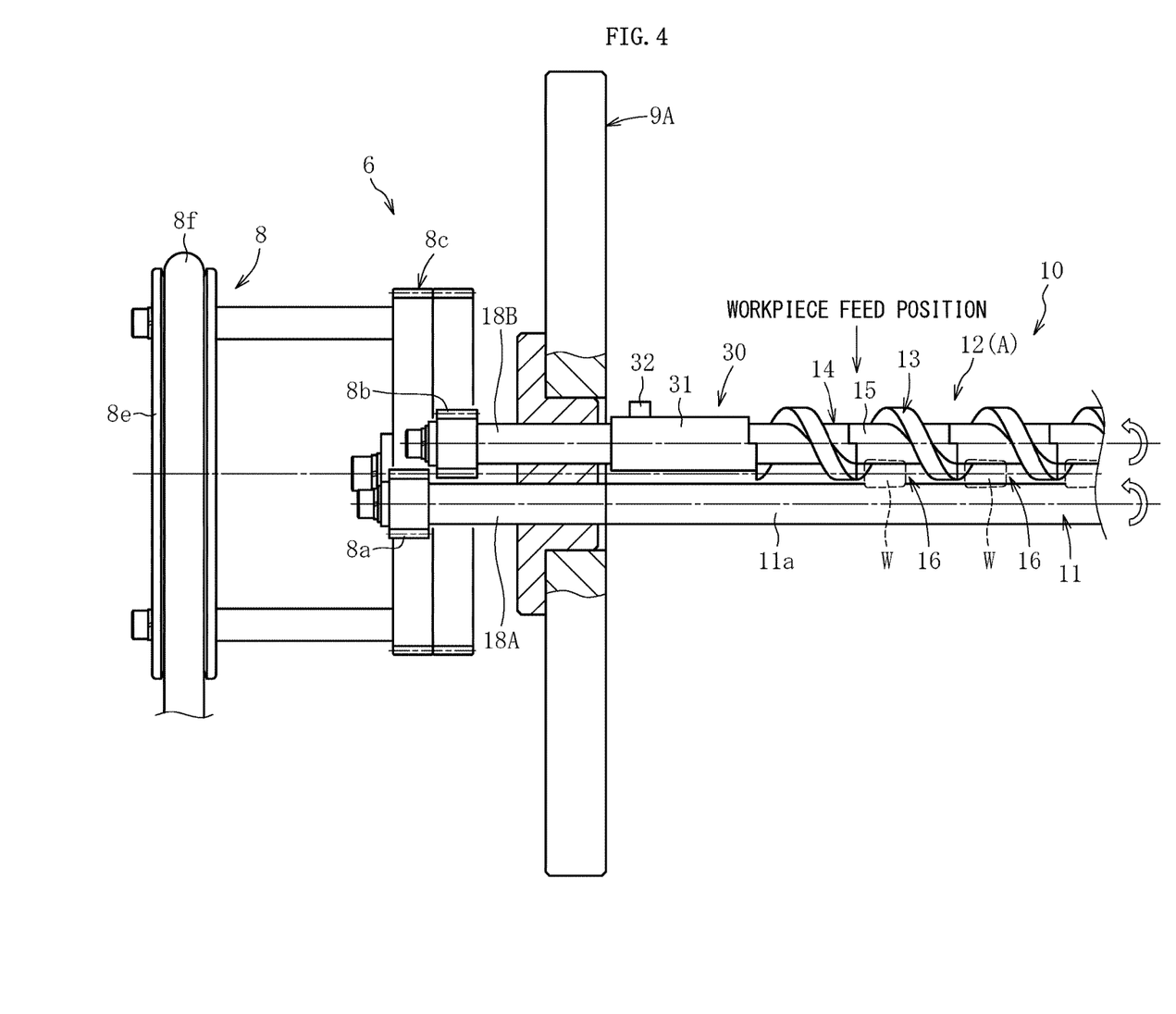
FIG. 4 is a partially enlarged plan view of the induction heating apparatus.
Figure 5A:
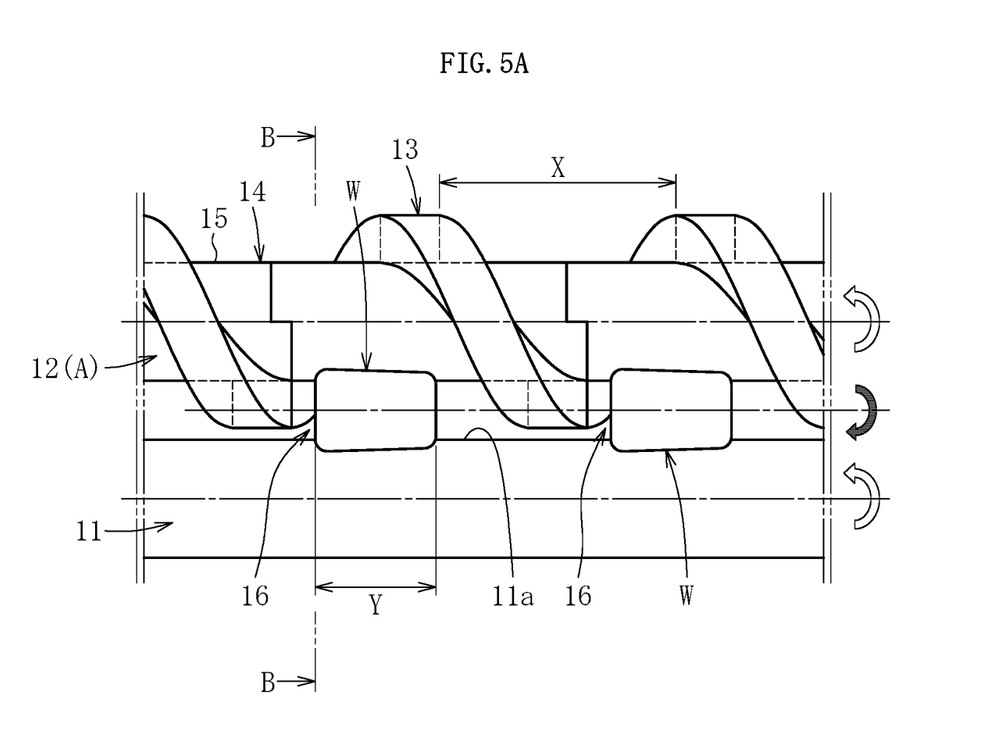
FIG. 5A is a partially enlarged plan view of a conveyance device included in the induction heating apparatus.

In FIG. 1, the overall structure of the heat treatment apparatus in which the conveyance device comprising the workpiece conveyance jig according to the embodiment of the present invention is to be used is schematically illustrated. A heat treatment apparatus 1 illustrated in FIG. 1 is to be used for performing quench hardening on a rod-shaped workpiece W having an outer peripheral surface with a circular cross section. The heat treatment apparatus 1 is configured to inductively heat the rod-shaped workpiece W to a target temperature while conveying the rod-shaped workpiece W along an axial direction thereof and then to cool the rod-shaped workpiece W. The rod-shaped workpiece W of this embodiment is a tapered roller, specifically, a base material for a tapered roller, as illustrated in FIG. 4 and FIG. 5A. In the following description, the term "axial direction" denotes an axial direction of the rod-shaped workpiece W.

As illustrated in FIG. 1, the heat treatment apparatus 1 comprises an induction heating apparatus 2 and a cooling section 20. The induction heating apparatus 2 is configured to inductively heat the rod-shaped workpiece W to the target temperature. The cooling section 20 as a cooling device is configured to cool the rod-shaped workpiece W discharged from the induction heating apparatus 2. The cooling section 20 is formed of, for example, a cooling liquid bath in which a cooling liquid such as quenching oil is stored.

Figure 2:
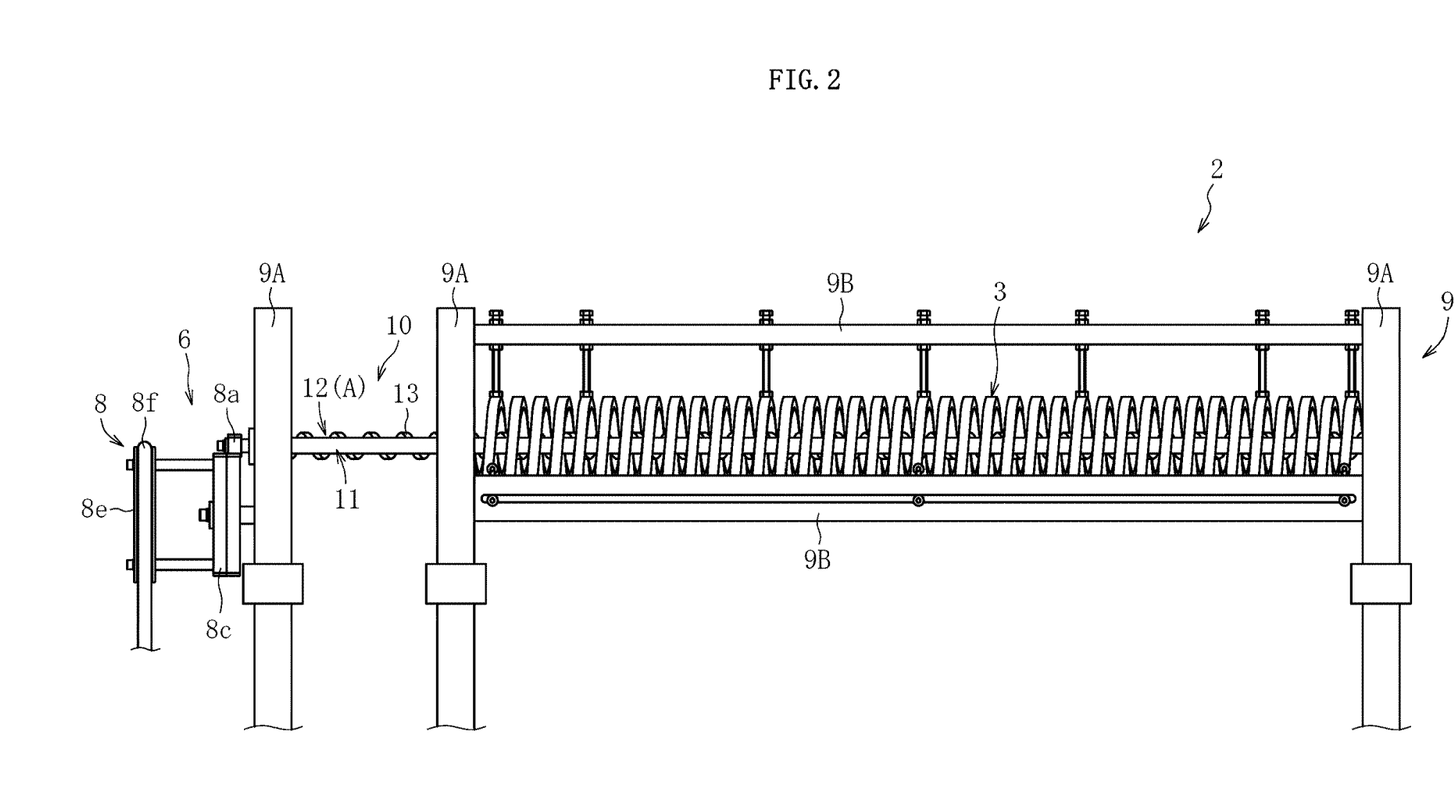
FIG. 2 is a schematic side view of an induction heating apparatus included in the heat treatment apparatus.

As illustrated in FIG. 1 and FIG. 2, the induction heating apparatus 2 comprises an induction heating coil 3 (hereinafter referred to simply as "heating coil 3"), a high-frequency power source 4, a controller 5, a frame body 9, and a conveyance device 10. The frame body 9 comprises base frames 9A and crossbars 9B. The base frames 9A are provided upright at a plurality of positions (three positions in an illustrated example) that are separated from each other in the axial direction. The crossbars 9B are fixed to the base frames 9A and extend in the axial direction.

The heating coil 3 is a so-called multi-winding coil formed by helically winding a tubular body made of a conductive metal, for example, a copper pipe, and is mounted and fixed to the crossbars 9B of the frame body 9 through intermediation of bolt members. As the heating coil 3, a heating coil having an axial dimension (total length dimension) that is sufficiently larger than an axial dimension of the rod-shaped workpiece W is used so as to be able to inductively heat a plurality of the rod-shaped workpieces W in a simultaneous manner. For example, when the rod-shaped workpiece W having an axial dimension of about 15 mm is to be inductively heated, a heating coil having an axial dimension of 600 mm or larger may be used as the heating coil 3. The heating coil 3 has an end on one axial side (corresponding to the left side on the planes of FIG. 1 and FIG. 2 and a carry-in side for the rod-shaped workpiece W; the same applies hereinafter) and an end on another axial side (corresponding to the right side on the planes of FIG. 1 and FIG. 2 and a carry-out side for the rod-shaped workpiece W; the same applies hereinafter), which are electrically connected to the high-frequency power source 4 illustrated in FIG. 1. The high-frequency power source 4 is electrically connected to the controller 5 illustrated in FIG. 1, and is configured to supply a predetermined amount of high-frequency current to the heating coil 3 based on a signal output from the controller 5.

Figure 5B:
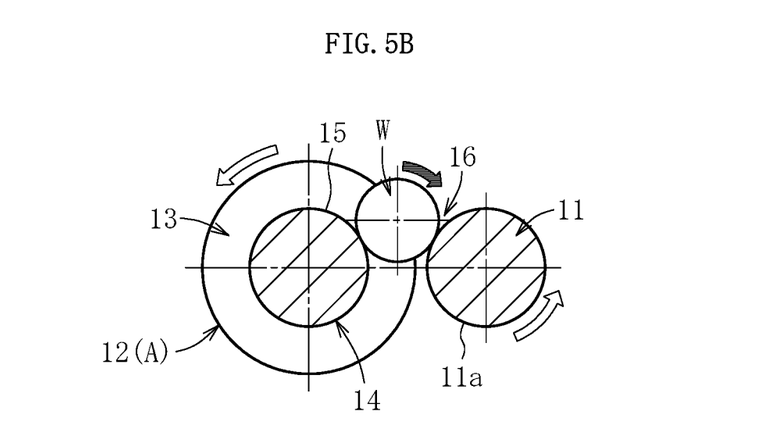
FIG. 5B is a schematic sectional view taken along the line B-B of FIG. 5A as seen in the direction indicated by the arrows.

As illustrated in FIG. 2 and also in FIG. 4, the conveyance device 10 is configured to convey the rod-shaped workpiece W along the axial direction. The conveyance device 10 comprises a first shaft member 11, a second shaft member 12, and a rotary mechanism 6. The first shaft member 11 and the second shaft member 12 are arranged inside the heating coil 3 so as to be separated from each other and extend in parallel to each other in the axial direction. The rotary mechanism 6 is configured to rotate the first shaft member 11 about an axis thereof and the second shaft member 12 about an axis thereof. The first shaft member 11 and the second shaft member 12 are supported so as to be freely rotatable relative to the frame body 9 under a state in which centers of rotation of the first shaft member 11 and the second shaft member 12 are positioned on the same plane, as illustrated in FIG. 5B. Each of the first shaft member 11 and the second shaft member 12 has a larger dimension than that of the heating coil 3 in the axial direction, and at least an end thereof on the one axial side projects to the outside of the heating coil 3.

As illustrated in FIG. 4 and FIG. 5A, the first shaft member 11 is formed of a columnar shaft having a cylindrical surface with a constant diameter as an outer peripheral surface 11a. The second shaft member 12 is formed of a threaded shaft having a (multi-winding) helical protrusion 13 formed along an outer periphery thereof. Both of the first shaft member 11 formed of the columnar shaft and the second shaft member 12 formed of the threaded shaft are made of a ceramic, which is a kind of non-magnetic material. As described above, in this embodiment, the second shaft member 12 serves as a workpiece conveyance jig A in the present invention. As the ceramic described above, for example, alumina, silicon nitride, zirconia, and silicon carbide may be used.

As illustrated in FIG. 4, FIG. 5A, and FIG. 5B, the rod-shaped workpieces W are supported in workpiece support portions 16 so that outer peripheral surfaces thereof are held in contact with a groove bottom surface 15 of a helical groove 14 that is defined on the outer periphery of the second shaft member 12 by the helical protrusion 13 and the cylindrical outer peripheral surface 11a of the first shaft member 11. The workpiece support portions 16 are formed by cooperation between the groove bottom surface 15 and the cylindrical outer peripheral surface 11a opposed thereto. A pitch and a width dimension of the helical protrusion 13 are set so that, when a groove width of the helical groove 14, specifically, an axial dimension of the groove bottom surface 15 is X and an axial dimension of the rod-shaped workpiece W is Y, a relational expression of Y<X is established. Based on the description given above, in the conveyance device 10, the workpiece support portions 16, which are configured to respectively support outer peripheral surfaces of the rod-shaped workpieces W in a contact manner, are formed at a plurality of positions that are separated from each other in the axial direction by cooperation between the first shaft member 11 and the second shaft member 12.

Figure 3:
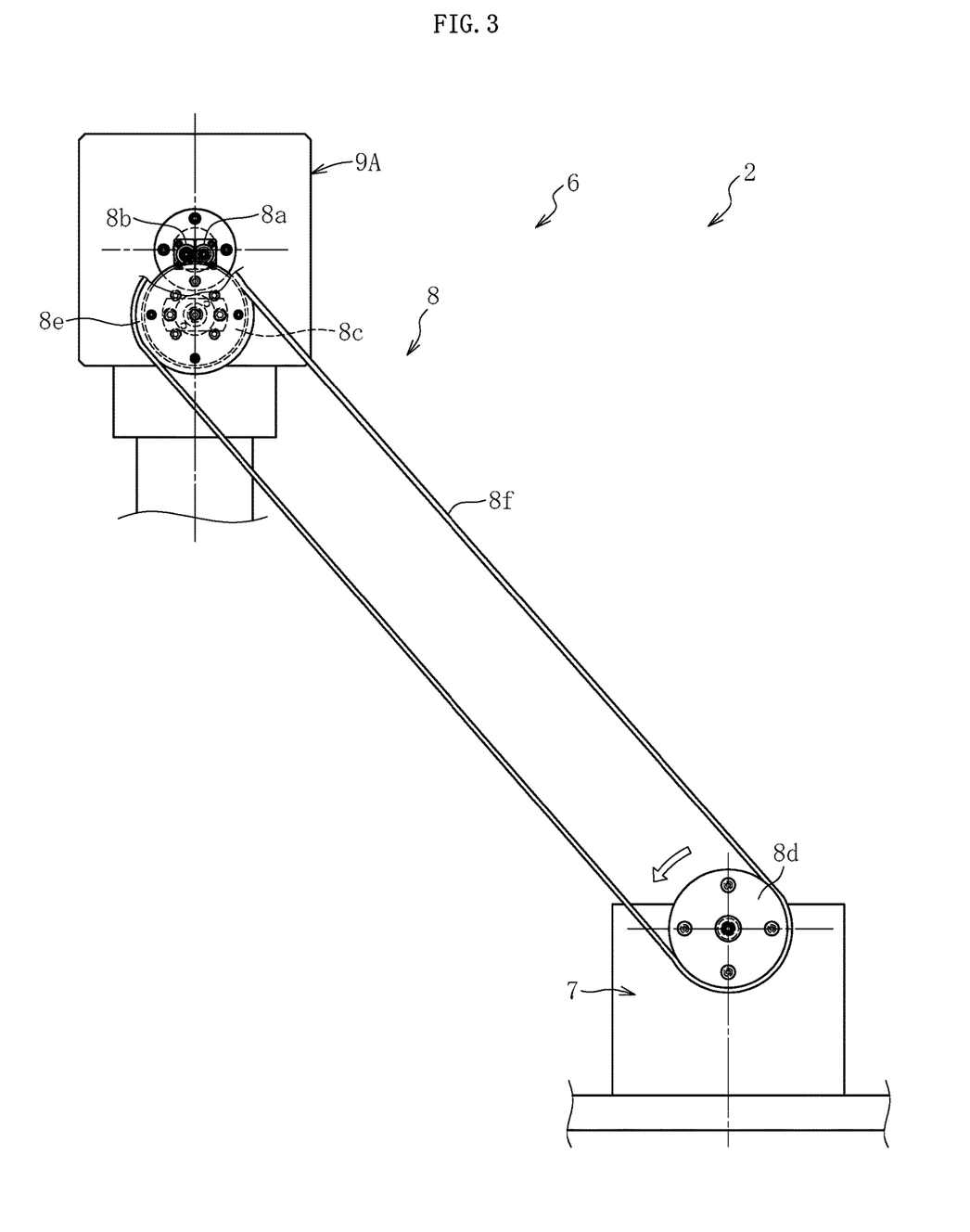
FIG. 3 is a schematic front view of the induction heating apparatus.

As illustrated in FIG. 2 to FIG. 4, the rotary mechanism 6 comprises an electric motor 7, for example, a servomotor, and a power transmission mechanism 8. The power transmission mechanism 8 is configured to transmit rotary power of the electric motor 7 to both of the first shaft member 11 and the second shaft member 12. The power transmission mechanism 8 comprises a gear shaft 18A, a gear shaft 18B, a large gear 8c, a drive pulley 8d, a driven pulley 8e, and an endless belt member 8f. The gear shaft 18A has a small gear 8a and is coupled to an end on one axial side of the first shaft member 11. The gear shaft 18B has a small gear 8b and is coupled to an end on one axial side of the second shaft member 12. The large gear 8c is supported on the frame body 9 so as to be freely rotatable and meshes with both of the small gears 8a and 8b. The drive pulley 8d is coupled to an output shaft of the electric motor 7. The driven pulley 8e is coupled to the large gear 8c. The endless belt member 8f, which may also be a chain, is looped over outer peripheral surfaces of the pulleys 8d and 8e. A tooth flank pitch of the small gear 8a and a tooth flank pitch of the small gear 8b are the same. Further, a tooth flank pitch of part of the large gear 8c, which meshes with the small gear 8a, and a tooth flank pitch of part of the large gear 8c, which meshes with the small gear 8b, are the same. The rotary mechanism 6 comprises the power transmission mechanism 8 described above. As a result, when the electric motor 7 is driven, the first shaft member 11 and the second shaft member 12 are rotated at the same velocity in the same direction. The electric motor 7 is electrically connected to a power source (not shown) and the controller 5 illustrated in FIG. 1, and is rotationally driven at a predetermined velocity based on a signal output from the controller 5.

When the heat treatment apparatus 1 having the configuration described above is used, the quench hardening for the rod-shaped workpiece W is carried out in the following mode.

First, through drive of the electric motor 7 (see FIG. 3), the first shaft member 11 and the second shaft member 12 are rotated about the axes thereof in the same direction, as indicated by the outlined arrows in FIG. 4. At the same time, the heating coil 3 is energized. Then, the rod-shaped workpiece W is fed from a workpiece feed position illustrated in FIG. 4 to the conveyance device 10, specifically, the workpiece support portion 16 thereof so that the outer peripheral surface of the rod-shaped workpiece W is supported in the workpiece support portion 16 in a contact manner. The workpiece support portions 16 are formed by the groove bottom surface 15 of the helical groove 14, which is defined on the second shaft member 12 by forming the helical protrusion 13 thereon. Therefore, while both of the first shaft member 11 and the second shaft member 12 are being rotated about the axes thereof through drive of the conveyance device 10, a feed force for conveying the rod-shaped workpiece W from the one axial side to the another axial side is continuously applied to the rod-shaped workpiece W, which is supported in the workpiece support portion 16. As a result, the rod-shaped workpiece W is inductively heated to the target temperature by passage through regions opposed to the heating coil 3 in an energized state while being conveyed in the axial direction. Then, the rod-shaped workpiece W having been discharged from the heating coil 3 is fed into the cooling liquid stored in the cooling section 20 and is cooled to a temperature falling within a predetermined temperature range to be quench-hardened.

When the rod-shaped workpiece W is conveyed in the above-mentioned mode, both of the first shaft member 11 and the second shaft member 12, which support the outer peripheral surface of the rod-shaped workpiece W in a contact manner, are rotated in the same direction. Thus, a rotative force for rotating the rod-shaped workpiece W about the axis thereof, specifically, rotating the rod-shaped workpiece W in a direction opposite to that of both of the first shaft member 11 and the second shaft member 12 is continuously applied to the rod-shaped workpiece W as indicated by the black arrows in FIG. 5A and FIG. 5B.

As described above, while the conveyance device 10 is being driven, not only the feed force for conveying the rod-shaped workpiece W from the one axial side to the another axial side but also the rotative force for rotating the rod-shaped workpiece W about the axis thereof are continuously applied to the rod-shaped workpiece W having the outer peripheral surface supported in the workpiece support portion 16 in a contact manner. Thus, the rod-shaped workpiece W, which is conveyed in the axial direction, is inductively heated while being rotated about the axis thereof. In this manner, the rod-shaped workpiece W can be inductively heated throughout portions in a uniform manner so that occurrence of the temperature unevenness in the rod-shaped workpiece W after the completion of heating can be effectively prevented. Therefore, after the rod-shaped workpiece W is cooled, the rod-shaped workpiece W of high quality without a difference in mechanical strength between portions in the circumferential direction and a cross-sectional direction can be obtained.

In this embodiment, in particular, the rotary mechanism 6 is configured so that the rotation velocity of the first shaft member 11 and the rotation velocity of the second shaft member 12, which support the outer peripheral surface of the rod-shaped workpiece W in a contact manner, become the same. Therefore, the rod-shaped workpiece W that is supported in the workpiece support portion 16 in a contact manner can be continuously rotated in a smooth fashion. Further, both of the first shaft member 11 and the second shaft member 12 are made of the ceramic that is a nonmagnetic material. Therefore, occurrence of heat transfer and cooling in contact portions between the rod-shaped workpiece W, and the first shaft member 11 and the second shaft member 12 can be prevented as much as possible. Therefore, occurrence of temperature unevenness in the rod-shaped workpiece W after the completion of heating can be more effectively prevented.

In this embodiment, the rod-shaped workpieces W are fed one by one at predetermined intervals from the workpiece feed position illustrated in FIG. 4 to the conveyance device 10 so that the plurality of rod-shaped workpieces W can be inductively heated in a simultaneous manner while being conveyed under a state in which the plurality of rod-shaped workpieces W are separated from each other in the axial direction. In this case, for example, the following problem can be prevented from arising as much as possible. Specifically, the rod-shaped workpieces W are welded together due to mutual contact between the rod-shaped workpieces W being currently conveyed, or each of the rod-shaped workpieces W is thermally affected by the rod-shaped workpiece W adjacent thereto. Thus, the rod-shaped workpiece W can be efficiently and accurately heated. For example, when the groove width X of the helical groove 14 and the axial dimension Y of the rod-shaped workpiece W are determined to satisfy, for example, the relational expression: X<2Y, only the single rod-shaped workpiece W is supported in each of the workpiece support portions 16 in a contact manner. In this case, the plurality of rod-shaped workpieces W can be conveyed and heated in a state of being reliably separated from each other in the axial direction.

Further, with the conveyance device 10 described above, the rod-shaped workpiece W can be conveyed in the axial direction even without being pushed by the subsequent workpiece as in the case disclosed in Patent Literature 1. Therefore, the induction heating apparatus 2 described above is suitably applicable even to a case in which the single rod-shaped workpiece W is the target to be heated or the rod-shaped workpieces W are in a small lot of several pieces, and, in addition, can heat each of the rod-shaped workpieces W accurately.

Figure 6:
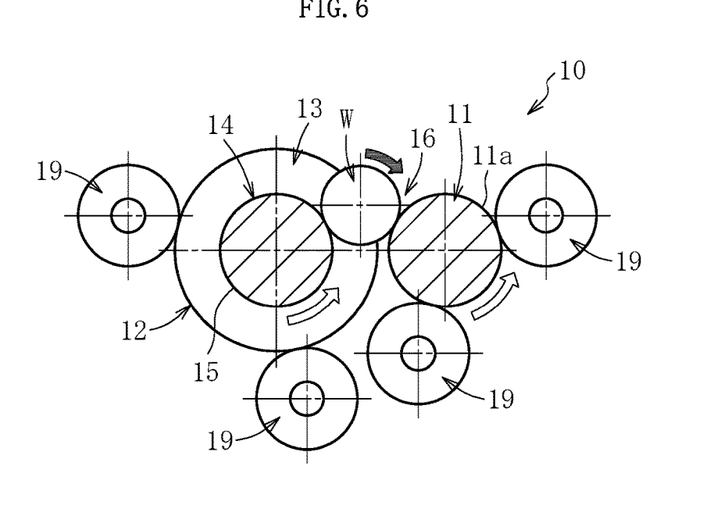
FIG. 6 is a schematic view for illustrating an example of a support mode of a first shaft member and a second shaft member (workpiece conveyance jig), which are included in the conveyance device.

In the induction heating apparatus 2 described above, 10, one or a plurality of support members (support rollers) 19 may be provided, as illustrated in FIG. 6. When the plurality of support members 19 are provided, the support members 19 are provided at a plurality of positions separated from each other in the axial direction. The support members 19 are configured to support regions of the outer peripheral surface of the first shaft member 11 and an outer peripheral surface of the second shaft member 12, which are regions other than the regions that form the workpiece support portions 16, in a contact manner. When the support rollers 19 described above are provided, occurrence of deflection in both of the first shaft member 11 and the second shaft member 12 can be prevented as much as possible. Therefore, the rod-shaped workpiece W can be supported and conveyed accurately. Although a detailed illustration is herein omitted, the support rollers 19 can be arranged onto the base frames 9A of the frame body 9.

Now, a structure of the second shaft member 12 serving as the workpiece conveyance jig A to be used in the conveyance device 10 described above and the induction heating apparatus 2 comprising the conveyance device 10 is described in detail.

Figure 7A:
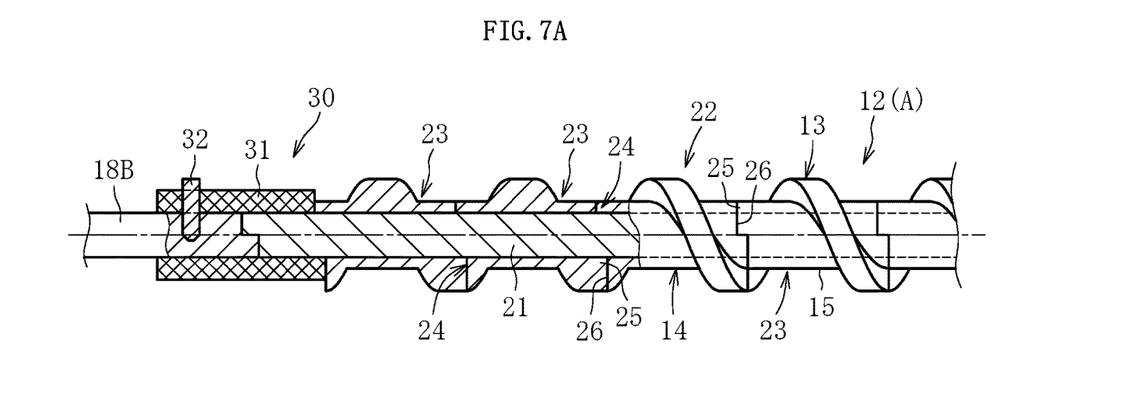
FIG. 7A is an enlarged view of a vicinity of an end of the workpiece conveyance jig on one axial side.
Figure 7B:
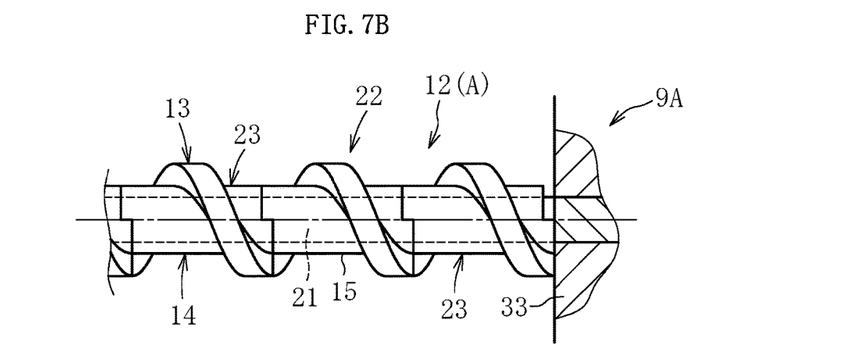
FIG. 7B is an enlarged view of a vicinity of an end of the workpiece conveyance jig on another axial side.

The second shaft member 12 comprises an inner member 21 and an outer member 22, as illustrated in FIG. 7A and FIG. 7B. The inner member 21 is made of a ceramic and is formed as a solid shaft (columnar shaft in this case) having a constant diameter. The outer member 22 has a hollow shaft-like shape, has the helical protrusion 13, and is mounted over an outer periphery of the inner member 21 so as to be rotatable integrally with the inner member 21. The inner member 21 is coupled to the gear shaft 18B included in the power transmission mechanism 8 (see, for example, FIG. 4) so that a torque can be transmitted to the inner member 21. In this embodiment, convex and concave fit is performed so that an end of the gear shaft 18B, which is located on the another axial side, and an end of the inner member 21, which is located on the one axial side, are engaged with each other in a direction of rotation of the gear shaft 18B.

The outer member 22 is formed by arranging cylindrical bodies 23 made of a ceramic next to each other in the axial direction (in series). In this embodiment, all the cylindrical bodies 23 are formed into the same shape.

Figure 8A:
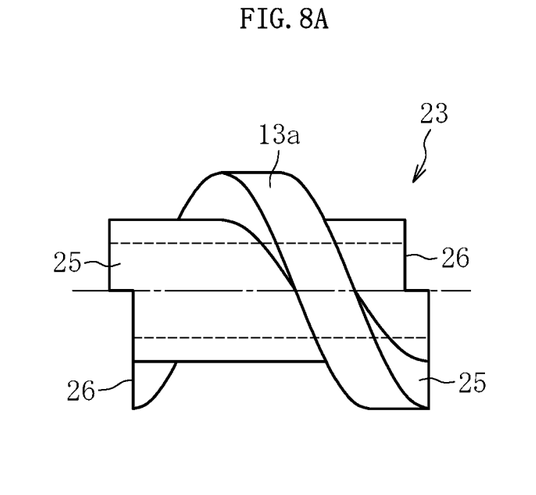
FIG. 8A is a front view of a cylindrical body included in the workpiece conveyance jig.
Figure 8B:
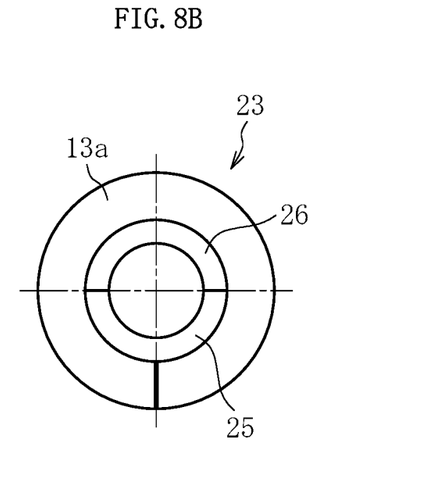
FIG. 8B is a right side view of the cylindrical body.

As illustrated in FIG. 8A and FIG. 8B, each of the cylindrical bodies 23 comprises a cylindrical portion having a cylindrical inner peripheral surface and a part 13a of the helical protrusion 13 in an integral manner. In this embodiment, one turn of the multi-winding helical protrusion 13 is formed integrally with the cylindrical portion. Convex portions 25 in the axial direction are formed at an end of the cylindrical body 23 on the one axial side and an end thereof on the another axial side, respectively. Each of the convex portions 25 of this embodiment is formed into a semi-cylindrical shape. As a result of the formation of the above-mentioned convex portions 25 at the end on the one axial side and at the end on the another axial side, concave portions (cutouts) 26, each having a semi-cylindrical shape, are formed at the end of the cylindrical body 23 on the one axial side and the end thereof on the another axial side, respectively. The convex portion 25 formed on the one axial side is formed at a position that is shifted by 180 degrees in phase in a circumferential direction of the cylindrical body 23 from a position of the convex portion 25 on the another axial side. The cylindrical body 23 having the configuration described above can be manufactured as, for example, an injection-molded product of ceramic powder, specifically, can be manufactured by ceramic injection molding (CIM).

The above-mentioned shape (mode) of the cylindrical body 23 is merely an example, and the cylindrical body 23 may be formed in other modes. However, it is preferred that the cylindrical body 23 be formed in a mode of being manufacturable by the CIM.

As illustrated in FIG. 7A and FIG. 7B, a convex and concave fitting portion 24 is formed between two adjacent ones of the cylindrical bodies 23 by fitting the convex portion 25 of one of the cylindrical bodies 23 to the concave portion 26 of another one of the cylindrical bodies 23 and fitting the concave portion 26 of the one cylindrical body 23 over the convex portion 25 of the another cylindrical body 23. With the convex and concave fitting portion 24 described above, the two adjacent cylindrical bodies 23 are engaged with each other in a direction of rotation of the inner member 21, specifically, the direction of rotation of the gear shaft 18B so that a rotational torque can be transmitted between the two adjacent cylindrical bodies 23.

In view of ease of assembly of the outer member 22, specifically, the cylindrical bodies 23 to the inner member 21, it is preferred that fitting of the cylindrical inner peripheral surface of each of the cylindrical bodies 23 over a cylindrical outer peripheral surface of the inner member 21 be achieved by so-called clearance fit (see JIS B 04041-1). In this case, unless measures are taken, the inner member 21 spins relative to the outer member 22. Therefore, the rotational torque of the inner member 21 cannot be appropriately transmitted to the outer member 22. Further, when the cylindrical bodies 23 are fitted over the inner member 21 by the clearance fit, the cylindrical bodies 23 can be freely moved in the axial direction. Therefore, there may arise disadvantages in that the cylindrical body 23 comes off the inner member 21 or the torque cannot be transmitted between the cylindrical bodies 23.

Therefore, in this embodiment, the above-mentioned various problems are solved as much as possible with a restricting part 30 configured to restrict separation (release of a convex and concave fitting state) of two adjacent ones of cylindrical bodies 23 from each other.

The restricting part 30 of this embodiment comprises a first engagement member 31, a second engagement member 33, and a screw member 32, as illustrated in FIG. 7A and FIG. 7B. The first engagement member 31 is arranged on the one axial side of the outer member 22 and is configured to be engaged with, in the axial direction, the outermost cylindrical body 23 that is arranged at the end on the one axial side. The second engagement member 33 is arranged on the another axial side of the outer member 22 and is configured to be engaged with, in the axial direction, the outermost cylindrical body 23 that is arranged at the end on the another axial side. The screw member 32 is configured to position and fix the first engagement member 31.

The first engagement member 31 is formed into a cylindrical shape. The first engagement member 31 is screwed and fixed to the gear shaft 18B with the screw member 32 under a state of being fitted over an outer periphery of a coupled portion between the gear shaft 18B and the inner member 21. An end of the first engagement member 31 on the another axial side and an end of the cylindrical body 23 on the one axial side, specifically, the outermost cylindrical body 23 arranged on the one axial side, are fitted by convex and concave fit. Hence, the first engagement member 31 is engaged with the outer member 22 in the direction of rotation of the gear shaft 18B. The second engagement member 33 is built into the base frame 9A of the frame body 9, specifically, the outermost base frame 9A arranged on the another axial side. With the restricting part 30 having the configuration descried above, the inner member 21 and the outer member 22 can be rotated integrally. As a result, the rotational torque is transmitted between the cylindrical bodies 23 included in the outer member 22. In addition, the outer member 22 is retained.

The above-mentioned second shaft member 12 serving as the workpiece conveyance jig A according to the present invention is formed of an assembly of the plurality of segmentalized members, specifically, the inner member 21 and the plurality of cylindrical bodies 23. In this case, in comparison to a case in which the entire threaded shaft is formed integrally of a ceramic material, each individual member can easily and accurately be manufactured. More specifically, the inner member 21 that is formed as the solid shaft having the constant diameter, specifically, a columnar shaft, can easily and accurately be manufactured even of the ceramic material. Further, because the outer member 22 having the helical protrusion 13 is formed of the plurality of cylindrical bodies 23 arranged in a row in the axial direction, as each of the cylindrical bodies 23, is only required to prepare cylindrical bodies each having a small dimension in the axial direction. Therefore, besides machining such as cutting, the CIM may be selected as a method of manufacturing the cylindrical bodies 23. With the CIM, even the cylindrical bodies 23, each having a complex shape that contains the part 13a of the helical protrusion 13, can easily and accurately be manufactured in comparison to manufacture of the cylindrical bodies 23 with the machining such as cutting. In particular, the inner member 21, which is a target over which the cylindrical bodies 23 are to be mounted, is formed to have a constant diameter. Therefore, the same parts can be used for all the plurality of cylindrical bodies 23. In this case, a cost reduction effect provided by the manufacture of the cylindrical bodies 23 with the CIM may be effectively enjoyed.

In terms of the structure of the present invention, after the inner member 21 and the plurality of cylindrical bodies 23 are individually manufactured, the inner member 21 and the plurality of cylindrical bodies 23 are required to be assembled to each other. Therefore, there is a fear of increasing an overall manufacturing cost, which may be brought about by additionally providing an assembly step. In this regard, the outer member 22 can be completed only by mounting the cylindrical bodies 23 over the outer periphery of the inner member 21 so that the cylindrical bodies 23 are fitted to each other by convex and concave fit. In this embodiment, in particular, the convex and concave fitting portion 24 is formed by fitting the convex portion 25 having the semi-cylindrical shape, which is formed on each of the cylindrical bodies 23, into the concave portion 26 of the cylindrical body 23 adjacent thereto. Therefore, phase matching between the two adjacent cylindrical bodies 23 is easy. Therefore, even with the additional assembly step, the manufacturing cost is little increased.

As described above, according to the present invention, the manufacturing cost of the workpiece conveyance jig A formed of the threaded shaft made of the ceramic can be significantly reduced from manufacturing cost that is required when the entire threaded shaft is made integrally of a ceramic material, specifically, when the threaded shaft is formed as a machined product made of a ceramic material. In practice, for example, when manufacturing costs of threaded shafts, each having a total length dimension of 700 mm, are compared, the manufacturing cost of the threaded shaft having the configuration of the present invention, specifically, the assembly of the inner member 21 formed of the columnar shaft having the constant diameter and the outer member 22 formed by arranging twenty-eight cylindrical bodies 23, each having a total length dimension of 25 mm, in a row in the axial direction, is required to be only about half the manufacturing cost that is required when the entire threaded shaft is made integrally of the ceramic material.

The workpiece conveyance jig A according to the present invention is to be rotationally driven about the axis thereof, and therefore is required to be able to transmit a rotational torque between the members, specifically, all the members are integrally rotatable. In this regard, the outer member 22 is mounted over the outer periphery of the inner member 21 so as to be rotatable integrally with the inner member 21 that receives the rotational driving force. Further, the convex and concave fitting portion 24 is formed between two adjacent ones of the cylindrical bodies 23 in the outer member 22 comprising the plurality of cylindrical bodies 23. Thus, the transmission of the torque is suitably ensured.

Further, the above-mentioned workpiece conveyance jig A according to this embodiment comprises the outer member 22 formed of the plurality of cylindrical bodies 23 arranged in the row in the axial direction. As a result, the workpiece conveyance jig A can also enjoy the following functions and effects.

When the number of cylindrical bodies 23 to be connected is changed, a request for, for example, change in total length dimension of the workpiece conveyance jig A can easily be complied with at low cost.

Each of the cylindrical bodies 23 comprises one of the turns of the helical protrusion 13 in an integral manner. Therefore, a request for, for example, change in pitch of part of the helical protrusion 13 can easily be complied with.

Even when, for example, the outer member 22 is partially lost, the cylindrical body 23 having the lost portion is only required to be replaced, and the entire threaded shaft is not required to be replaced. Thus, maintenance cost can be reduced.

The workpiece conveyance jig A, the conveyance device 10, and the induction heating apparatus 2 according to the embodiment of the present invention have been described above. Various changes are possible for the workpiece conveyance jig A, the conveyance device 10, and the induction heating apparatus 2.

In the workpiece conveyance jig A, for example, the outer peripheral surface of the inner member 21 and the inner peripheral surface of the outer member 22, specifically, the inner peripheral surfaces of the cylindrical bodies 23 are engaged with each other in the direction of rotation of the workpiece conveyance jig A. In this manner, the inner member 21 and the outer member 22 can be formed so as to be integrally rotatable. The configuration described above can be achieved by, for example, forming a solid shaft having a polygonal cross section as the inner member 21 and forming the inner peripheral surface of the outer member 22, specifically, the inner peripheral surface of each of the cylindrical bodies 23 into a polygonal shape.

In the conveyance device 10, the workpiece conveyance jig A according to the present invention may be applied not only to the second shaft member 12 but also to the first shaft member 11 that forms the workpiece support portions 16 in cooperation with the second shaft member 12.

The rotation velocity of the first shaft member 11 about the axis thereof and the rotation velocity of the second shaft member 12 about the axis thereof are not necessarily required to be set to the same velocity, and may be set different from each other as long as the rod-shaped workpiece W can be rotated about the axis thereof. In order to set different rotation velocities for the first shaft member 11 and the second shaft member 12, for example, the tooth flank pitch of the small gear 8a to be coupled to the first shaft member 11 and the large gear 8c that meshes therewith and the tooth flank pitch of the small gear 8b to be coupled to the second shaft member 12 and the large gear 8c that meshes therewith are only required to be set different from each other.

The above-mentioned rotary mechanism 6 to be included in the conveyance device 10 is merely an example, and another rotary mechanism 6 may be adopted. For example, two electric motors may be provided so that the first shaft member 11 is coupled to an output shaft of one of the electric motors and the second shaft member 12 is coupled to an output shaft of another one of the electric motors.

In the induction heating apparatus 1, a plurality of the heating coils 3 may be arranged along the axial direction. With the arrangement described above, the heating coils 3 may be set to have different outputs. Thus, it becomes easy to optimize a heating mode for the rod-shaped workpiece W. As a method of setting the heating coils 3 to have different outputs, for example, the following methods are considered. Specifically, Coil pitches of the heating coils 3, each being formed of a multi-winding coil, are set different from each other; and A high-frequency power source is individually connected to each of the heating coils 3, and outputs of the high-frequency power sources are regulated.

Although the tapered roller, more specifically, the base material for the tapered roller, has been exemplified as the rod-shaped workpiece W in the description above, the workpiece conveyance jig A, the conveyance device 10, and the induction heating apparatus 2 according to the present invention can suitably be used even in a case in which a rolling element for another roller bearing, such as a cylindrical roller for a cylindrical bearing and a needle roller for a needle roller bearing, is to be inductively heated. Further, the workpiece conveyance jig A according to the present invention can suitably be used even in a case in which not only for the solid rod-shaped workpiece W such as the various types of rollers described above but also the rod-shaped workpiece W, which is hollow, is to be conveyed, specifically, to be inductively heated while being conveyed.

The present invention is not limited to the above-mentioned embodiment. The present invention may be carried out in various modes without departing from the spirit of the present invention. The scope of the present invention is defined in claims, and encompasses equivalents described in claims and all changes within the scope of claims.

REFERENCE SIGNS LIST 1 heat treatment apparatus
2 induction heating apparatus
3 heating coil
6 rotary mechanism 9 frame body
10 conveyance device
11 first shaft member
12 second shaft member
13 helical protrusion
14 helical groove
15 groove bottom surface
16 workpiece support portion
21 inner member
22 outer member
23 cylindrical body
24 convex and concave fitting portion
25 convex portion (in axial direction)
26 concave portion
A workpiece conveyance jig
W rod-shaped workpiece

The invention claimed is:

1. A workpiece conveyance jig, which is formed of a shaft-shaped body made of a ceramic, the shaft-shaped body having a helical protrusion formed along an outer periphery of the shaft-shaped body, and is to be rotationally driven along an axis of the workpiece conveyance jig under a state of being arranged inside an induction heating coil, the workpiece conveyance jig comprising:
   an inner member, which is formed of a solid shaft having a constant diameter, and is configured to receive a rotational driving force; and
   an outer member, which has a hollow shaft shape, has the helical protrusion, and is mounted on an outer periphery of the inner member so as to be rotatable together with the inner member,
   wherein the outer member comprises:
      a plurality of cylindrical bodies arranged in a row in an axial direction of the workpiece conveyance jig, each of the plurality cylindrical bodies having an inner peripheral surface that faces an outer peripheral surface of the inner member; and
      a convex and concave fitting portion formed between two adjacent ones of the plurality of cylindrical bodies, and
   wherein the convex and concave fitting portion is configured to engage the two adjacent cylindrical bodies with each other in a direction of rotation of the inner member.

2. The workpiece conveyance jig according to claim 1, wherein the convex and concave fitting portion includes a convex portion having a semi-cylindrical shape formed at an each of an end of each of the cylindrical bodies on one axial side and at an end of each of the cylindrical bodies on another axial side, and
   wherein, for each of the cylindrical bodies, the convex portion on the one axial side is formed at a position that is shifted by 180 degrees in phase in a circumferential direction of the cylindrical body from a position of the convex portion on the another axial side.

3. The workpiece conveyance jig according to claim 1, wherein the each of the cylindrical bodies comprises one turn of the helical protrusion in an integral manner.

4. The workpiece conveyance jig according to claim 1, wherein the inner member comprises a columnar shaft.

5. The workpiece conveyance jig according to claim 1,
   wherein the inner peripheral surface of each of the plurality of cylindrical bodies is fitted over the outer peripheral surface of the inner member by clearance fit, and
   wherein rotation of the inner member is transmitted to the outer member through intermediation of a restricting part configured to restrict separation of two adjacent ones of the plurality of cylindrical bodies.

6. A conveyance device configured to convey a rod-shaped workpiece, which has an outer peripheral surface with a circular cross section, and is a target to be inductively heated, along an axial direction of the rod-shaped workpiece, the conveyance device comprising:
   a first shaft member and a second shaft member, which extend parallel to each other in the axial direction and are separated from each other, the first shaft member and the second shaft member being configured to support the outer peripheral surface of the rod-shaped workpiece in a contact manner in cooperation with each other; and
   a rotary mechanism configured to rotate the first shaft member about an axis of the first shaft member and the second shaft member about an axis of the second shaft member in the same direction,
   wherein at least one of the first shaft member and the second shaft member is formed of the workpiece conveyance jig of claim 1.

7. The conveyance device according to claim 6, wherein one of the first shaft member and the second shaft member is formed of the workpiece conveyance jig, and another of the first shaft member and the second shaft member is formed of a columnar shaft having a constant diameter.

8. The conveyance device according to claim 6, wherein the rotary mechanism is configured to rotate the first shaft member and the second shaft member at the same velocity.

9. The conveyance device according to claim 6, wherein the rod-shaped workpiece comprises a roller for a roller bearing.

10. An induction heating apparatus, comprising:
    the conveyance device of claim 6; and
    an induction heating coil to be arranged around the first shaft member and the second shaft member, which are included in the conveyance device.

* * * * *